(12) United States Patent
Schipper et al.

(10) Patent No.: US 10,712,450 B2
(45) Date of Patent: Jul. 14, 2020

(54) INTELLIGENT SATELLITE EXCLUSION FOR MULTIPATH MITIGATION BASED ON LINE OF SIGHT

(71) Applicant: Honeywell International Inc., Morris Plains, NJ (US)

(72) Inventors: Brian Schipper, Brooklyn Park, MN (US); Mats Anders Brenner, Plymouth, MN (US); Martin Musil, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 242 days.

(21) Appl. No.: 15/866,031

(22) Filed: Jan. 9, 2018

(65) Prior Publication Data

US 2019/0212456 A1    Jul. 11, 2019

(51) Int. Cl.
| | |
|---|---|
| *G01S 19/42* | (2010.01) |
| *G01S 19/22* | (2010.01) |
| *G01S 19/28* | (2010.01) |
| *G01S 19/21* | (2010.01) |
| *G01S 19/52* | (2010.01) |

(52) U.S. Cl.
CPC .......... *G01S 19/428* (2013.01); *G01S 19/215* (2013.01); *G01S 19/22* (2013.01); *G01S 19/28* (2013.01); *G01S 19/52* (2013.01); *G01S 19/423* (2013.01)

(58) Field of Classification Search
CPC ...... G01S 19/215; G01S 19/22; G01S 19/423; G01S 19/428; G01S 19/52; G01S 19/28
USPC .................................................... 342/357.25
See application file for complete search history.

(56) References Cited

U.S. PATENT DOCUMENTS

| | | | |
|---|---|---|---|
| 6,191,731 B1 | 2/2001 | McBurney et al. | |
| 8,035,557 B2 | 10/2011 | Thomson et al. | |
| 9,562,976 B2 | 2/2017 | Diggelen et al. | |
| 2008/0020783 A1 | 1/2008 | Pitt et al. | |
| 2010/0019962 A1* | 1/2010 | Fujita | G01S 19/14 342/357.57 |
| 2011/0057833 A1 | 3/2011 | France et al. | |
| 2012/0200456 A1* | 8/2012 | Gildea | G01S 19/52 342/357.25 |
| 2013/0234885 A1* | 9/2013 | Geier | G01S 19/44 342/357.23 |

(Continued)

OTHER PUBLICATIONS

European Patent Office, "Extended European Search Report from EP Application No. 19150435.6 dated Jun. 4, 2019", from Foreign Counterpart to U.S. Appl. No. 15/866,031, pp. 1-7, Published: EP.

*Primary Examiner* — Timothy X Pham
(74) *Attorney, Agent, or Firm* — Fogg & Powers LLC

(57) ABSTRACT

A method of operating a global positioning receiver is provided. The method includes receiving a plurality of signals from a plurality of satellites. At least a measurement from and location of each satellite is determined based on the received plurality of signals. An approximate vehicle velocity vector is determined based on the received plurality of signals. A dot product between a line of sight between each satellite and a vehicle having the receiver and the determined vehicle velocity vector is determined. Each measurement associated with each determined dot product that is below a minimum dot product threshold is removed to obtain a resultant set of measurements. A position solution based on the resultant set of measurements is then determined.

19 Claims, 5 Drawing Sheets

(56) References Cited

U.S. PATENT DOCUMENTS

| | | |
|---|---|---|
| 2015/0035700 A1 | 2/2015 | Van Diggelen et al. |
| 2015/0234053 A1* | 8/2015 | Psiaki .................. G01S 19/215 342/357.51 |
| 2017/0299728 A1 | 10/2017 | Lie et al. |

* cited by examiner

INTELLIGENT SATELLITE EXCLUSION FOR MULTIPATH MITIGATION BASED ON LINE OF SIGHT

BACKGROUND

Global Navigation Satellite Systems (GNSS) broadcast signals from a plurality of satellites using Code Division Multiple Access (CDMA) where a signal from each satellite is identified by a unique pseudorandom code (spreading code). At a GNSS receiver, overlapping signals from all satellites are processed to determine navigation measurements, such as receiver position and velocity measurements. The processing involves first searching for the presence of a signal and an estimation of its frequency offset and code offset relative to a reference clock (acquisition) and then refining the estimates, demodulating the received data and determining the GNSS receiver position (tracking). Both acquisition and tracking involve correlating received signals with a locally generated version of the pseudo random codes over an integration period.

A minimum of four GNSS satellites are needed to compute a receiver position (latitude, longitude, and altitude) and GNSS system time. The more satellites available to the receiver, the more accurate the navigation measurements. Determining accurate locations based on GNSS is becoming more critical as more and more systems are using GNSS for location and navigation. Errors can occur in satellite signals. Devices that process the signals have been implemented to deal with faulty signals. However one type of error that current systems do not address well is multipath errors.

SUMMARY

The following summary is made by way of example and not by way of limitation. It is merely provided to aid the reader in understanding some of the aspects of the subject matter described. Embodiments provide a GNSS receiver operation that removes satellite measurements associated with signals from satellites that may have multipath errors before a position solution is calculated and thus yields a more accurate position and velocity solution.

In one embodiment, a method of operating a global navigation satellite system receiver is provided. The method includes receiving a plurality of signals from a plurality of satellites. At least a measurement from and location of each satellite is determined of the received plurality of signals. An approximate vehicle velocity vector is determined based on the received plurality of signals. A dot product between a line of sight between each satellite and a vehicle having the receiver and the determined vehicle velocity vector is determined. Each measurement associated with each determined dot product that is below a minimum dot product threshold is removed to obtain a resultant set of measurements. A position solution based on the resultant set of measurements is then determined. The "minimum" dot product threshold defines the smallest dot product that associates with a satellite measurement that is OK to use for the position solution.

In another example embodiment, another method of operating a global navigation satellite system receiver is provided. The method includes receiving a plurality of signals from a plurality of satellites. At least a measurement from and location of each satellite based on the received plurality of signals is determined. An approximate vehicle velocity vector based on the received plurality of signals is determined. A dot product between a line of sight between each satellite and a vehicle having the receiver and the determined vehicle velocity vector is determined. Each determined dot product is compared with a minimum dot product threshold. Each measurement associated with each determined dot product that is below the minimum dot product is removed to obtain a resultant set of measurements. A geometric reliability factor of the resultant set of measurements is determined. The dot product minimum threshold is decreased when the determined geometric reliability factor is more than a defined maximum geometric reliability factor threshold to allow more measurements to be included in the resultant set of measurements. A position solution is determined based on the resultant set of measurements and the position solution is implemented.

In yet another embodiment, a global positioning system is provided. The global positioning system includes a receiver, a memory and at least one controller. The receiver is configured to receive satellite signals from a plurality of satellites. The memory is configured to store operating instructions. The at least one controller is configured to implement the operating instruction to, determine at least a measurement from and a location of each satellite based on the received plurality of signals, determine an approximate vehicle velocity vector based on the received plurality of signals, determine a dot product between the line of sight between each satellite and a vehicle having the global positioning receiver and the determined vehicle velocity vector, remove each measurement associated with each determined dot product that is below a minimum dot product threshold to obtain a resultant set of measurements, determine a geometric reliability factor of the resultant set of measurements, decrease the dot product minimum threshold when the determined geometric reliability factor is more than a defined maximum geometric reliability factor threshold, and determine a position solution based on the resultant set of measurements.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote similar elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide methods for dealing with multipath errors. While much effort has been made in receiver and antenna technology to minimize errors, multipath remains a significant source of error in Global Navigation Satellite System (GNSS) range measurements and position solution. In order to meet position accuracy requirements for airport surface navigation, the need to reduce multipath errors is desired to improve position solution accuracy.

The development of GNSS constellations such as Galileo, GLONASS, and BeiDou provide the availability of a lot of satellites to provide many more measurements then needed to compute a position solution. This enables the receiver to eliminate some measurements that may include multipath error as described in detail below.

Multipath is always a problem when trying to determine a position solution for a stationary object. When an object is not moving, the only motion in play is the motion of the satellites as they slowly move across the sky. The slowly moving geometry introduces multipath errors that the receiver associated with the object on the ground cannot deal with very well. The multipath errors look like slowly moving oscillations or biases. These types of biases are more difficult to deal with than a noisy signal because unlike a noisy signal, which you can smooth out, the bias caused by the multipath error is generally smooth and slowly varying.

When the object or vehicle associated with the receiver is moving, the geometry changes rapidly even when you are not moving very quickly. The movement minimizes any multipath error except when a satellite is generally orthogonal to the direction of travel.

Figure 1:
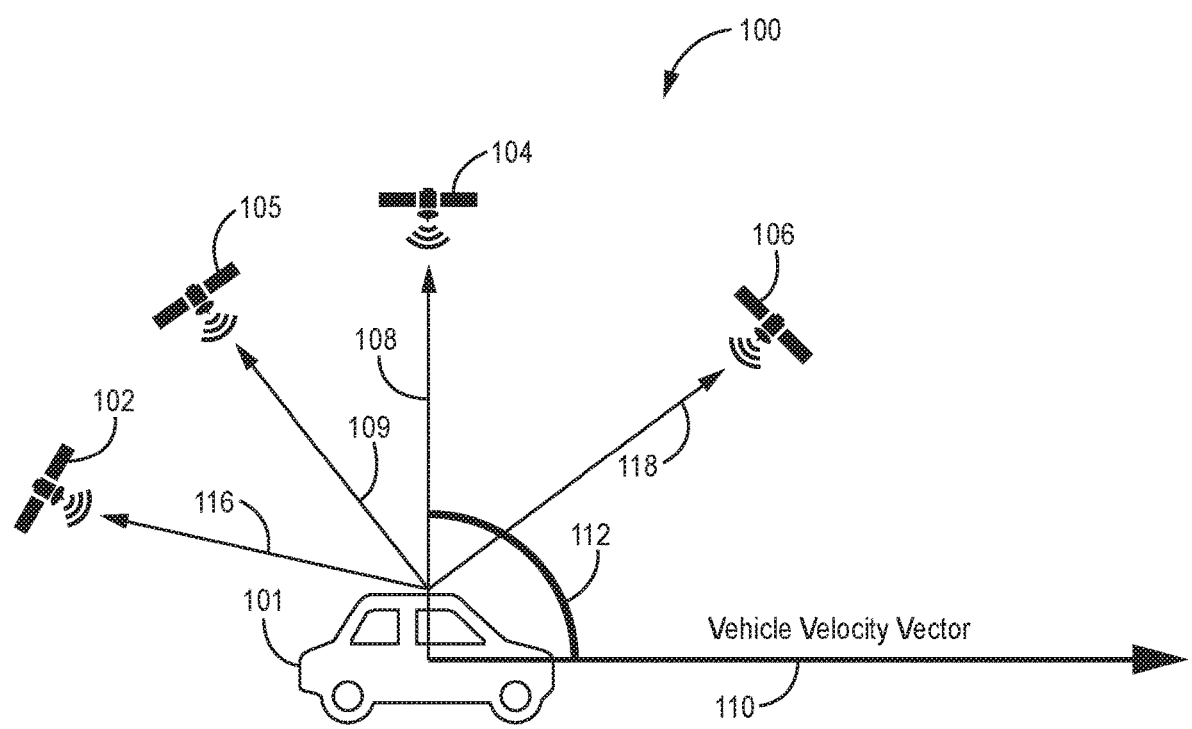
FIG. 1 is an illustration of a position determining system according to one exemplary embodiment.
Figure 2:
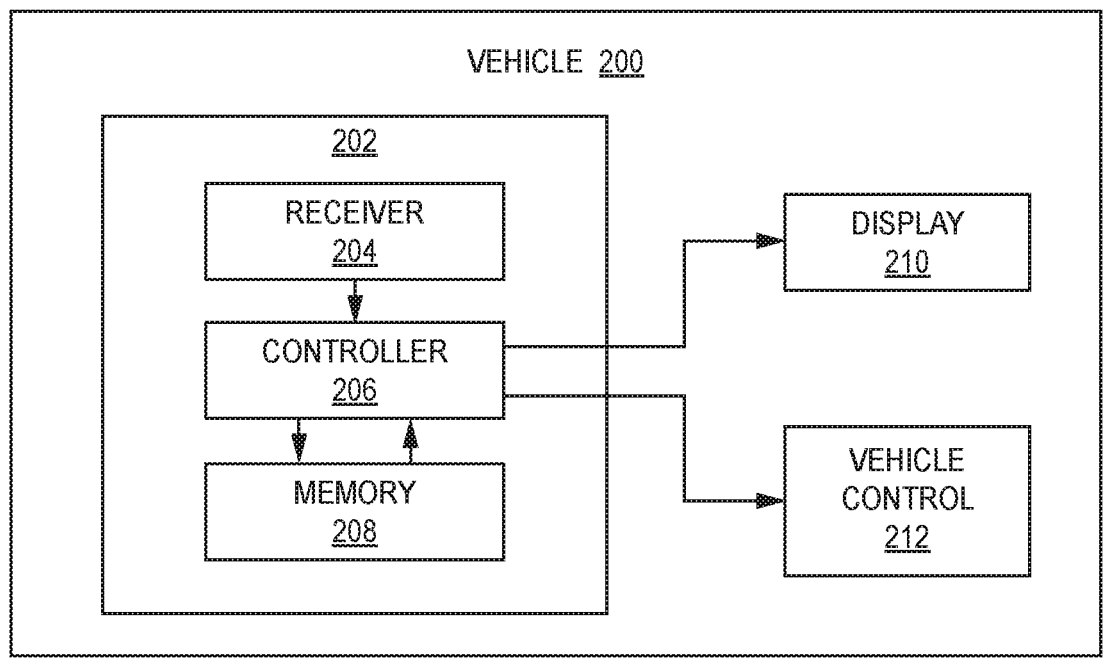
FIG. 2 is a block diagram of a vehicle including a global positioning system according to one exemplary embodiment.

Referring to FIG. 1, a position determining system 110 of an exemplary embodiment is illustrated. The position determining system 100 includes a plurality of the satellites 102, 104, 105 and 106 and a vehicle 101. The vehicle 101 will include a GNSS receiver and controller (shown in FIG. 2) to determine a position solution based on signals from the satellites 102, 104, 105 and 106. FIG. 1 further illustrates the line of sights 116, 109, 108, and 118 (signal paths), between the respective satellites 102, 105, 104 and 106. Vehicle 101 is illustrated as traveling along a vehicle vector velocity 110. The line of sight 108 between the vehicle 101 and satellite 104 is orthogonal to the vehicle velocity vector in this example. Similar to the stationary example set out above, multipath errors may be present when the line of sight 108 between the satellite 104 and the vehicle 101 is orthogonal to the vehicle velocity vector 110. In a GNSS with more than enough satellites needed to determine a position, embodiments simply remove information received from the satellite 104 that may include multipath errors.

In an embodiment, a controller is used to determine if a line of sight 108 between a satellite 104 and a vehicle 101 is close to orthogonal 112 to a vehicle velocity vector 110 using a dot product discussed in detail below. An example of a vehicle 200 having a Global Positioning System (GPS) 202 with a controller 206 is illustrated in the block diagram of FIG. 2. The vehicle 200 may be any type of vehicle capable of moving, such as but not limited to, a car, truck, aircraft, boat etc. The GPS 202 in this example embodiment includes the controller 206, a receiver 204 and a memory 208. The receiver 204 is configured to receive signals from satellites. The controller 206 processes the signals using instructions stored in the memory 208 to determine and implement position solutions. Vehicle 200 in this example is illustrated as also including a display 210 that may be used to display a position solution and a vehicle control 212 that may be used in an embodiment to control the direction of travel of the vehicle 200 based in least in part on implemented position solutions.

In general, the controller 206 may include any one or more of a processor, microprocessor, a digital signal processor (DSP), an application specific integrated circuit (ASIC), a field program gate array (FPGA), or equivalent discrete or integrated logic circuitry. In some example embodiments, controller 206 may include multiple components, such as any combination of one or more microprocessors, one or more controllers, one or more DSPs, one or more ASICs, one or more FPGAs, as well as other discrete or integrated logic circuitry. The functions attributed to the controller 206 herein may be embodied as software, firmware, hardware or any combination thereof. The controller 206 may be part of a system controller or a component controller. As stated above, the memory 208 may include computer-readable operating instructions that, when executed by the controller 206 provides functions of the GPS 202. Such functions may include the functions of identifying signals from each satellite that is positioned such that the line of sight between the satellite and the vehicle 200 is orthogonal to the velocity vector of the vehicle and functions to mitigate possible multipath errors. The computer readable instructions may be encoded within the memory 208. Memory 208 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 3:
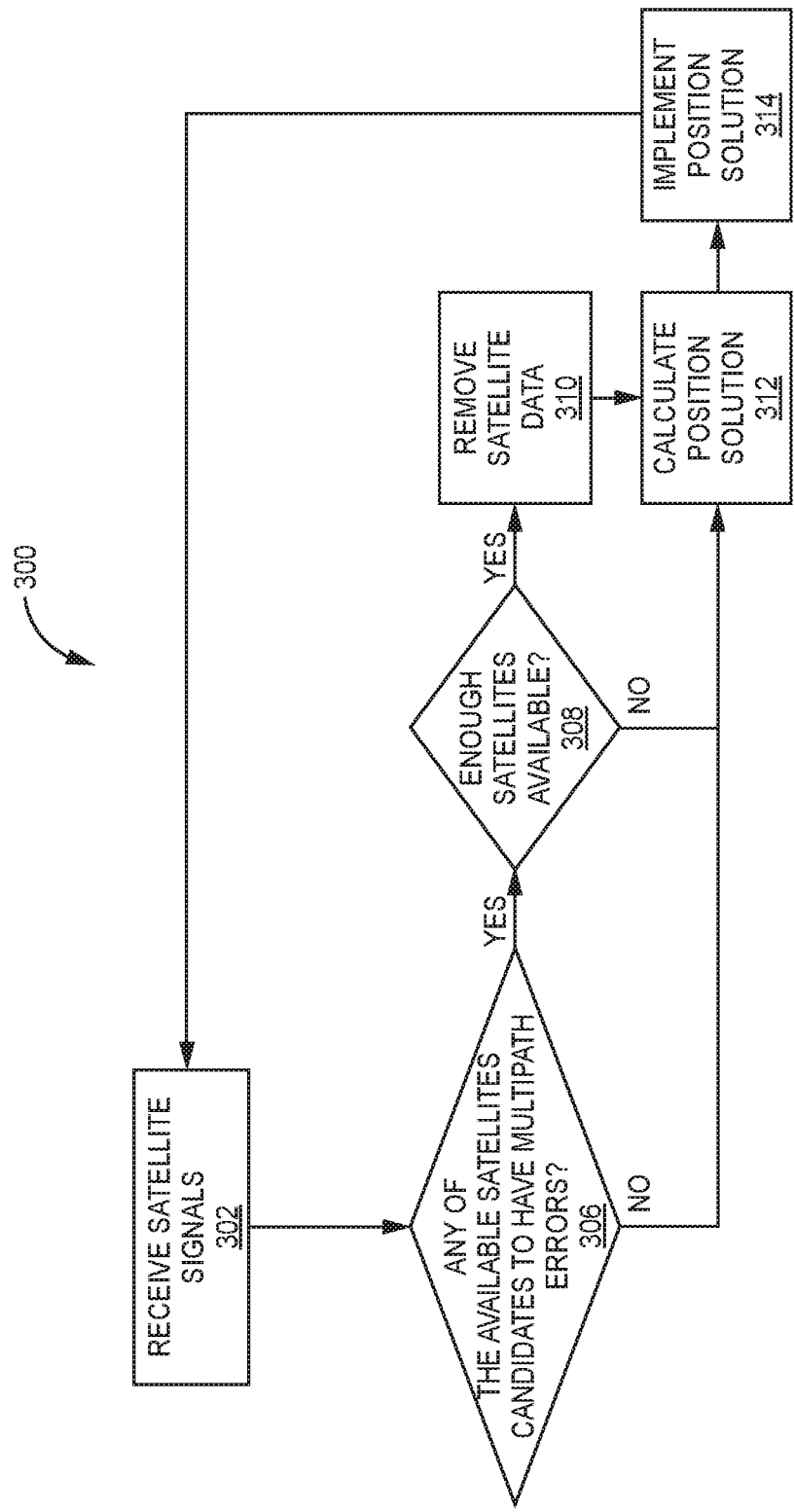
FIG. 3 is a position solution flow diagram according to one exemplary embodiment.

In embodiments, the controller 206 determines if satellites are in a location in relation to the vehicle that would indicate their signals may include multipath errors. If there are enough satellites available to determine a position solution to a needed accuracy, a signal from one or more satellites that may include multipath errors are not used in determining a position solution. Referring to FIG. 3, a general position solution flow diagram 300 of one embodiment is illustrated. The position solution flow diagram 300 is provided as a series of steps. The order of the steps may occur in a different sequence in other embodiments. Hence, embodiments are not limited to the sequence of steps provided in the position solution flow diagram of FIG. 3. In the example embodiment position solution flow diagram 300 of FIG. 3, the satellite signals are received by a receiver 204 at step (302).

It is then determined if any of the available satellites are candidates to have multipath errors at step (306). If it is determined at step (306) that none of the available satellites are candidates to have multipath error, a position solution is calculated at step (312). The calculated position solution may then be implemented at step (314). For example, the calculated position solution may be displayed in an output device or be used in a vehicle guidance system. The process continues by the receiving satellite signals at step (302).

If it is determined at step (306) that at least one satellite of the satellites available is a candidate to have multipath errors, it is determined if there are enough satellites still available to determine an accurate position solution to a desired accuracy if the signal from the at least one satellite is not used for the solution determination at step (308). If it is determined at step (308) that there are not enough satellites available without the at least one satellite that is a candidate to have multipath errors, the position solution is calculated at step (312) with the at least one of the satellite that is a candidate to have multipath errors.

If, however, it is determined at step (308) that there are enough satellites that have provided a signal that are still available to determine a position solution within a desired accuracy, the satellite data from the at least one satellite that is a candidate to have multipath error is removed at step (310). The position solution is then calculated at step (312). The process then continues as described above at step (314).

Figure 4:
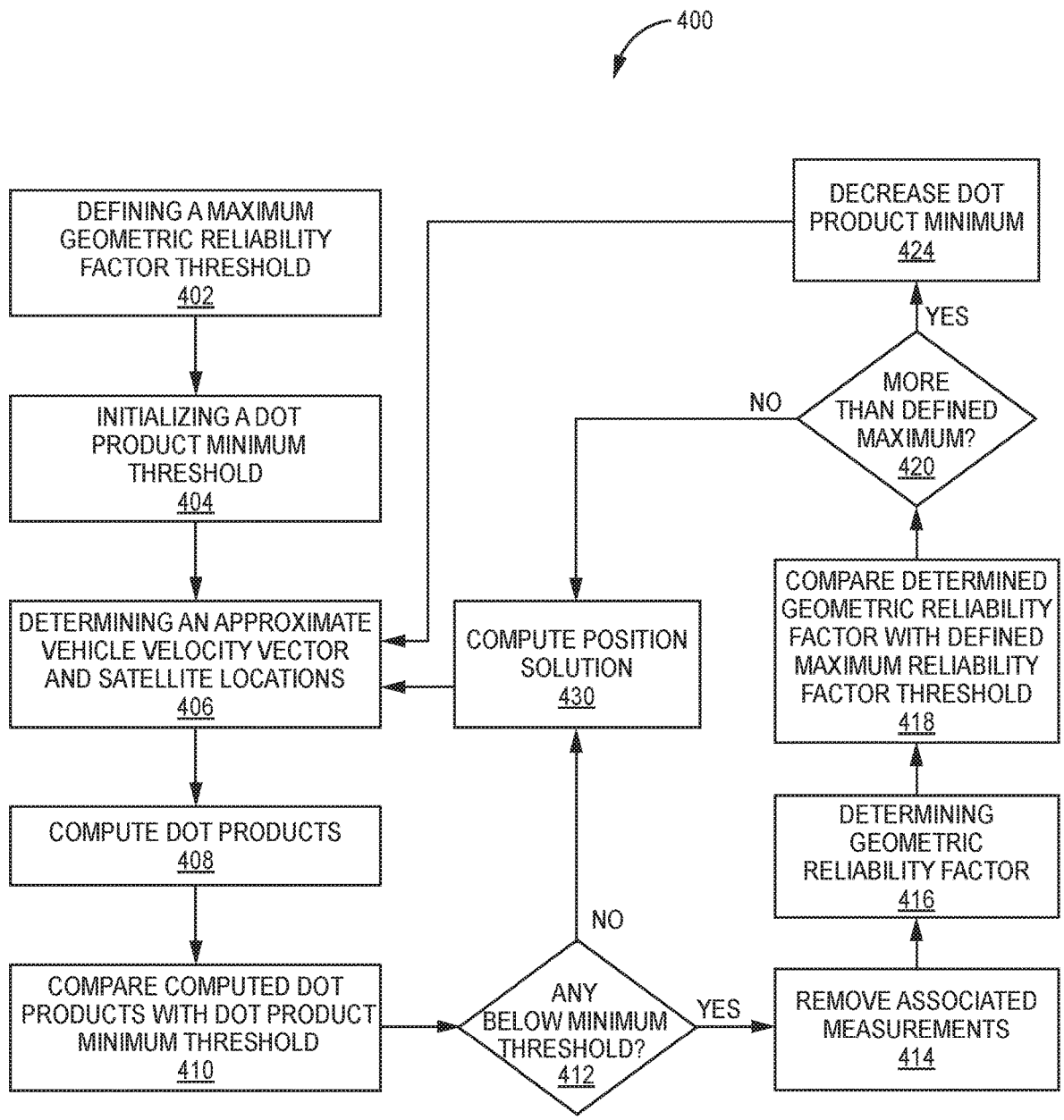
FIG. 4 is a multipath error candidate determination flow diagram according to one exemplary embodiment.

An example method of determining if a satellite is a candidate to include multipath errors is illustrated in the multipath error candidate determination flow diagram 400 of FIG. 4. The multipath error candidate determination flow diagram 400 is provided as a series of steps. The order of the steps may occur in a different sequence in other embodiments. Hence, embodiments are not limited to the sequence of steps provided in the multipath error candidate flow diagram of FIG. 4.

The multipath error candidate determination flow diagram 400 of FIG. 4 starts by first defining a maximum geometric reliability factor threshold at step (402). The maximum geometric reliability factor threshold may include at least one of geometric integrity and accuracy factors. Examples of a geometric integrity factors includes a Horizontal Protection Level (HPL) and a Vertical Protection Level (VPL). Examples of geometric accuracy factors include, but are not limited to, at least one of a maximum Position Dilution of Precision (PDOP), a Horizontal Dilution of Precision (HDOP) and a Vertical Dilution of Precision (VDOP). The maximum geometric reliability factor threshold is the value needed to achieve a position solution of a desired accuracy or integrity for a given situation. For example, a geometric reliability factor threshold with a relatively low maximum may be needed in a roadway navigation situation that requires tight precision. A higher maximum geometric reliability factor threshold may be applied in a situation where the vehicle does not need to follow a roadway and there are no obstructions nearby.

A dot product minimum threshold (DPMT) is initialized at step (404). DPMT is the value that is defined by how orthogonal the line of sight between the vehicle and a satellite is to the vehicle velocity vector. The DPMT is a small number such as 0.01. As discussed below, the DPMT may be adjusted through the process as needed.

An approximate vehicle velocity vector and available satellite locations are determined at step (406). A GNSS receiver, such as GNSS receiver 204 of FIG. 2, includes functions to determine the vehicles velocity vector as well as functions that determine the location of available satellites in a GNSS. Hence, this information is already available for GNSS receiver systems.

A dot product is then computed for each GNSS measurement from each satellite in the GNSS available to the GNSS receiver using the vehicle velocity vector and the location of the respective satellite in relation to the vehicle at step (408). A dot product, also called a scalar product, is a number (or scalar quantity) obtained by preforming an operation on vector components (the vehicle velocity vector and the line of sight between each respective satellite). In an example of an operation, where a coordinate system is used the scalar product of two vectors is determined by multiplying x coordinates for each vector, then multiply their y coordinates and then z coordinates and then adding the three products. If the vectors are orthogonal, the operation will result in zero. Moreover, the operation applied to vectors that are close to being orthogonal will have a relatively small result.

The computed dot products are then compared to the initialized dot product minimum threshold at step (410). If it is determined that none of the GNSS measurements are associated with satellites having a computed dot product below the initialized dot product minimum threshold at step (412), a position solution is determined from all of the GNSS measurements at step (230) and the process then continues at step (406). If however, it is determined that at least one GNSS measurement of the GNSS measurements is associate with a satellite that has a computed dot product below the initialized dot product minimum threshold at step (412), the at least one of the GNSS measurements is/are removed from consideration at step (414) so as to not be used when computing a position solution. This provides a resultant set of GNSS measurements.

A geometric reliability factor from the resultant set of GNSS measurements is determined at step (416). The determined geometric reliability factor is then compared with the defined maximum geometric reliability factor threshold at step (418). If the determined geometric reliability factor is less than the defined maximum geometric reliability factor threshold at step (420), a position solution is determined from the resultant set of GNSS measurements at step (430) and the process continues step (406). If the determined geometric reliability factor is more than the defined maximum geometric reliability factor threshold at step (420), the dot product minimum is decreased at step 424 and the process continues at step (406) and at step (410) the computed dot products are compared with the new decreased dot product minimum threshold. If at least one of the GNSS measurement of the GNSS measurements is associate with a satellite that has a computed dot product below the decreased dot product minimum threshold at step (412), the at least one GNSS measurement is/are removed from consideration at step (414) so as to not be used when computing a position solution. This provides a resultant set of GNSS measurements. This ensures that enough GNSS measurements are available to satisfy the geometric reliability factor threshold.

Further embodiments combine a worst case range error based on the dot product with a solution sensitivity. For example, in an embodiment addressing more stringent surface operations, a limit on the worst case horizontal error may be used. In this embodiment, a worst case smoothed pseudo range error $\Delta\rho_{max}$ may be determined by simulation or by collecting data in a specified environment. Using the determined range error, for example say $\Delta\rho_{max}$ equals 0.3 m, when moving and applying the dot product monitoring (as described above) a worst case horizontal error is calculated for the vehicle based on a least square solution matrix S or other method such as inertial integration that factors in satellite geometry. For the least square example $\underline{\Delta x}=S\ \underline{\Delta\rho}$ where $\underline{\Delta x}$ is horizontal position relative to a reference point and $\underline{\Delta\rho}$ is a vector with N pseudo range measurement innovations (measured pseudo range–predicted pseudo range) S is 2×N with elements sin(i=1,2 and n=1, . . . , N).

Figure 5:
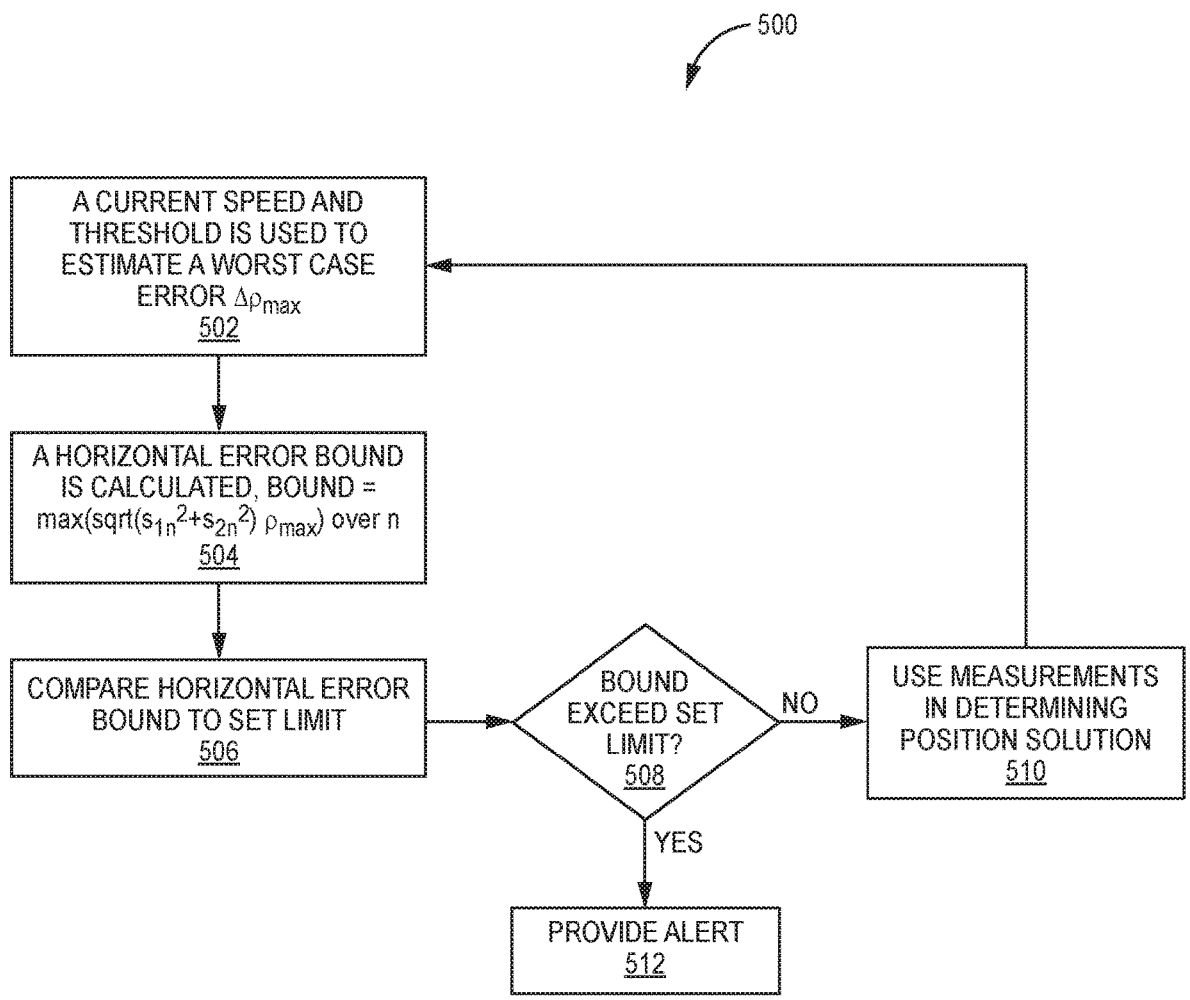
FIG. 5 illustrates a worst case horizontal flow diagram according to one exemplary embodiment.

Referring to FIG. 5, a worst case horizontal flow diagram 500 of an exemplary embodiment is provided in a series of steps. The steps are provided in a sequential order. However the order of steps may be different in other embodiments. In an embodiment, the steps of FIG. 5, are applied after the satellites that are below the minimum dot product threshold are removed as described in detail above. At step (502), a current speed of the vehicle and threshold is used to estimate a worst case error $\Delta\rho_{max}$. The threshold is the minimum dot product threshold discussed above. Based on the estimated worst case error and on geometry, a horizontal error bound is calculated (504). The geometry, for example, may use a least square solution matrix to find a horizontal bound such as bound=max(sqrt($s_{1n}^2+s_{2n}^2$) $\Delta\rho$max). The horizontal error bound is then compared to a set limit (506). The set limit may be, but is not limited to, a set limit provided by the Federal Aviation Administration (FAA) for that surface operation. If the bound exceeds the set limit at step (508), an alert is provided at step (512). If the bound does not exceed the set limit at step (510), measurements received are used for a position solution and the process continues at step (502).

EXAMPLE EMBODIMENTS

Example 1 is a method of operating a global navigation satellite system receiver. The method includes receiving a plurality of signals from a plurality of satellites. At least a measurement from and location of each satellite is determined based on the received plurality of signals. An approximate vehicle velocity vector is determined based on the received plurality of signals. A dot product between a line of sight between each satellite and a vehicle having the receiver and the determined vehicle velocity vector is determined. Each measurement associated with each determined dot product that is below a minimum dot product threshold is removed to obtain a resultant set of measurements. A position solution based on the resultant set of measurements is then determined.

Example 2, includes the method of Example 1, further including determining a geometric reliability factor of the resultant set of measurements and decreasing the dot product minimum threshold when the determined geometric reliability factor is more than a defined maximum geometric reliability factor threshold.

Example 3 includes the method of any of the Examples 1-2, wherein the defined maximum geometric reliability factor threshold is based on at least one of a needed integrity and accuracy of the global navigation satellite system receiver.

Example 4 includes the method of any of the Examples 1-3, wherein the geometric reliability factor is at least one of a horizontal protection level, a vertical protection level, a position dilution of precision, a horizontal dilution of precision and a vertical dilution of precision.

Example 5 includes the method of any of the Examples 1-4, further including re-computing the geometric reliability factor from an updated resultant set of measurements based on the decreased dot product minimum threshold. When the re-computed geometric reliability factor is still above the maximum geometric reliability factor threshold, further decreasing the dot product minimum threshold. Only those measurements associated with a computed dot product that are below the further decreased dot product minimum are removed to obtain a further updated resultant set of measurements.

Example 6 includes the method of any of the Examples 1-6, further including implementing the position solution.

Example 7 includes the method of the Example 6, wherein implementing the position solution includes controlling at least in part the direction of travel of the vehicle.

Example 8 includes the method of Example 6, wherein implementing the position solution includes displaying the position solution.

Example 9 includes the method of any of the Examples 1-8, further including determining if enough satellites are available to calculate an accurate position solution.

Example 10 includes the method of any of the Examples 1-9, further including smoothing the received plurality of signals.

Example 11 includes the method of any of the Examples 1-10, further including estimating a worst case range error based on the current speed and the minimum dot product threshold. A horizontal error bound is calculated based on geometry and at least in part on the estimated worst case range error. The calculated horizontal bound is compared to a set limit and an alert is provided when the bound exceeds the set limit.

Example 12 includes the method of Example 11, further wherein when the bound does not exceed the set limit, using the received signal from the plurality of satellites to determine a position solution.

Example 13 includes the method of any of the Examples 11-12, wherein the determined current speed of a vehicle housing the global navigation satellite system receiver is based on the received plurality of signals.

Example 14 includes a method of operating a global navigation satellite system receiver. The method includes receiving a plurality of signals from a plurality of satellites. At least a measurement from and location of each satellite based on the received plurality of signals is determined. An approximate vehicle velocity vector based on the received plurality of signals is determined. A dot product between a line of sight between each satellite and a vehicle having the receiver and the determined vehicle velocity vector is determined. Each determined dot product is compared with a minimum dot product threshold. Each measurement associated with each determined dot product that is below the minimum dot product threshold is removed to obtain a resultant set of measurements. A geometric reliability factor of the resultant set of measurements is determined. The dot product minimum threshold is decreased when the determined geometric reliability factor is more than a defined maximum geometric reliability factor threshold to allow more measurements to be included in the resultant set of measurements. A position solution is determined based on the resultant set of measurements and the position solution is implemented.

Example 15 includes the method of Example 14, wherein the geometric reliability factor is based on at least one of a horizontal protection level, a vertical protection level, a position dilution of precision, a horizontal dilution of precision and a vertical dilution of precision.

Example 16 is a global positioning system including a receiver, a memory and at least one controller. The receiver is configured to receive satellite signals from a plurality of satellites. The memory is configured to store operating instructions. The at least one controller is configured to implement the operating instruction to, determine at least a measurement from and location of each satellite based on the received plurality of signals, determine an approximate vehicle velocity vector based on the received plurality of signals, determine a dot product between a line of sight between each satellite and a vehicle having the global positioning receiver and the determined vehicle velocity vector, remove each measurement associated with each determined dot product that is below a minimum dot product threshold to obtain a resultant set of measurements, determine a geometric reliability factor of the resultant set of measurements, decrease the dot product minimum threshold when the determined geometric reliability factor is more than a defined maximum geometric reliability factor threshold, and determine a position solution based on the resultant set of measurements.

Example 17 includes the global positioning system of Example 16, wherein the geometric reliability factor is at least one of a horizontal protection level, a vertical protection level, a position dilution of precision, a horizontal dilution of precision and a vertical dilution of precision.

Example 18 includes the global positioning system of any of the Examples 16-17, wherein the controller is further configured to, re-compute the geometric reliability factor from an updated resultant set of measurements based on the decreased dot product minimum threshold, when the re-computed geometric reliability factor is still above the maximum geometric reliability factor threshold, decrease the dot product minimum threshold and remove only those measurements associated with a computed dot product that is below the decreased dot product minimum to obtain a further updated resultant set of measurements.

Example 19 includes the global positioning system of any of the Examples 16-18 further including a vehicle control configured to navigate the vehicle based at least in part on the position solution.

Example 20 includes the global positioning system of any of the Examples 16-19 further including a display to display the position solution.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating a global navigation satellite system receiver, the method comprising:
receiving a plurality of signals from a plurality of satellites at a vehicle with the global navigation satellite system receiver;
using at least one controller in,
determining at least a measurement from and location of each satellite based on the received plurality of signals;
determining an approximate vehicle velocity vector based on the received plurality of signals;
determining a dot product between a line of sight between each satellite and a vehicle having the receiver and the determined vehicle velocity vector;
removing each measurement associated with each determined dot product that is below a minimum dot product threshold to obtain a resultant set of measurements;
determining a geometric reliability factor of the resultant set of measurements;
decreasing the dot product minimum threshold when the determined geometric reliability factor is more than a defined maximum geometric reliability factor threshold; and
determining a position solution based on the resultant set of measurements.

2. The method of claim 1, wherein the defined maximum geometric reliability factor threshold is based on at least one of a needed integrity and accuracy of the global navigation satellite system receiver.

3. The method of claim 1, wherein the geometric reliability factor is at least one of a horizontal protection level, a vertical protection level, a position dilution of precision, a horizontal dilution of precision and a vertical dilution of precision.

4. The method of claim 1, further comprising:
re-computing the geometric reliability factor from an updated resultant set of measurements based on the decreased dot product minimum threshold;
when the re-computed geometric reliability factor is still above the maximum geometric reliability factor threshold, further decreasing the dot product minimum threshold; and
removing only those measurements associated with a computed dot product that are below the further decreased dot product minimum to obtain a further updated resultant set of measurements.

5. The method of claim 1, further comprising:
implementing the position solution.

6. The method of claim 5, wherein implementing the position solution includes controlling at least in part the direction of travel of the vehicle.

7. The method of claim 5, wherein implementing the position solution includes displaying the position solution.

8. The method of claim 1, further comprising:
determining if enough satellites are available to calculate an accurate position solution.

9. The method of claim 1, further comprising:
smoothing the received plurality of signals.

10. The method of claim 1, further comprising:
estimating a worst case range error based on the current speed and the minimum dot product threshold;
calculating a horizontal error bound based on geometry and at least in part on the estimated worst case range error;
comparing the calculated horizontal bound to a set limit; and
providing an alert when the bound exceeds the set limit.

11. The method of claim 10, further wherein when the bound does not exceed the set limit, using the received signal from the plurality of satellites to determine a position solution.

12. The method of claim 10, wherein the determined current speed of a vehicle housing the global navigation satellite system receiver is based on the received plurality of signals.

13. A method of operating a global navigation satellite system receiver, the method comprising:
receiving a plurality of signals from a plurality of satellites at a vehicle with the global navigation satellite system receiver;
using at least one controller in,
determining at least a measurement from and location of each satellite based on the received plurality of signals;
determining an approximate vehicle velocity vector based on the received plurality of signals;
determining a dot product between a line of sight between each satellite and a vehicle having the receiver and the determined vehicle velocity vector;
comparing each determined dot product with a minimum dot product threshold
removing each measurement associated with each determined dot product that is below the minimum dot product threshold to obtain a resultant set of measurements;
determining a geometric reliability factor of the resultant set of measurements;

decreasing the dot product minimum threshold when the determined geometric reliability factor is more than a defined maximum geometric reliability factor threshold to allow more measurements to be included in the resultant set of measurements;

determining a position solution based on the resultant set of measurements; and implementing the position solution.

14. The method of claim 13, wherein the geometric reliability factor is based on at least one of a horizontal protection level, a vertical protection level, a position dilution of precision, a horizontal dilution of precision and a vertical dilution of precision.

15. A global positioning system comprising:

a receiver configured to receive satellite signals from a plurality of satellites;

a memory configured to store operating instructions; and at least one controller, the controller configured to implement the operating instruction to, determine at least a measurement from and location of each satellite based on the received plurality of signals, determine an approximate vehicle velocity vector based on the received plurality of signals, determine a dot product between a line of sight between each satellite and a vehicle having the global positioning receiver and the determined vehicle velocity vector, remove each measurement associated with each determined dot product that is below a minimum dot product threshold to obtain a resultant set of measurements, determine a geometric reliability factor of the resultant set of measurements, decrease the dot product minimum threshold when the determined geometric reliability factor is more than a defined maximum geometric reliability factor threshold, and determine a position solution based on the resultant set of measurements.

16. The global positioning system of claim 15, wherein the geometric reliability factor is at least one of a horizontal protection level, a vertical protection level, a position dilution of precision, a horizontal dilution of precision and a vertical dilution of precision.

17. The global positioning system of claim 15, wherein the controller is further configured to, re-compute the geometric reliability factor from an updated resultant set of measurements based on the decreased dot product minimum threshold;

when the re-computed geometric reliability factor is still above the maximum geometric reliability factor threshold, decrease the dot product minimum threshold; and remove only those measurements associated with a computed dot product that is below the decreased dot product minimum to obtain a further updated resultant set of measurements.

18. The global positioning system of claim 15, further comprising:

a vehicle control configured to navigate the vehicle based at least in part on the position solution.

19. The global positioning system of claim 15, further comprising:

a display to display the position solution.

* * * * *